United States Patent
Xu et al.

(10) Patent No.: US 10,462,468 B2
(45) Date of Patent: Oct. 29, 2019

(54) METHOD AND SYSTEM OF DECODED PICTURE BUFFER FOR INTRA BLOCK COPY MODE

(71) Applicant: MEDIATEK INC., Hsinchu (TW)

(72) Inventors: Xiaozhong Xu, State College, PA (US); Shan Liu, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/757,104

(22) PCT Filed: Sep. 6, 2016

(86) PCT No.: PCT/CN2016/098182
§ 371 (c)(1),
(2) Date: Mar. 2, 2018

(87) PCT Pub. No.: WO2017/041692
PCT Pub. Date: Mar. 16, 2017

(65) Prior Publication Data
US 2018/0184093 A1 Jun. 28, 2018

Related U.S. Application Data

(60) Provisional application No. 62/245,372, filed on Oct. 23, 2015, provisional application No. 62/215,287, filed on Sep. 8, 2015.

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/134* (2014.11);
(Continued)

(58) Field of Classification Search
CPC ..... H04N 19/70; H04N 19/159; H04N 19/172
See application file for complete search history.

(56) References Cited

U.S. PATENT DOCUMENTS

| 2012/0106634 A1 | 5/2012 | Jeon et al. | |
|---|---|---|---|
| 2014/0269899 A1* | 9/2014 | Park | H04N 19/44 375/240.02 |
| 2015/0063440 A1* | 3/2015 | Pang | H04N 19/174 375/240.02 |

FOREIGN PATENT DOCUMENTS

CN 101841717 A 9/2010

OTHER PUBLICATIONS

International Search Report dated Dec. 5, 2016, issued in application No. PCT/CN2016/098182.
(Continued)

*Primary Examiner* — Zhubing Ren
(74) *Attorney, Agent, or Firm* — Oblon, McClelland, Maier & Neustadt, L.L.P.

(57) ABSTRACT

A method for a video encoder or decoder using an Intra Block Copy (IntraBC) mode is disclosed. If IntraBC mode is enabled and no loop filter is used for a current picture, a currently decoded reference picture for the current picture is marked as a long-term reference picture before and during decoding of the current picture. The currently decoded reference picture is assigned in reference picture list construction for IntraBC reference of the current picture and buffer fullness for the DPB is calculated before starting decoding the current picture by taking into account of only one reference picture buffer. According to another method, if the maximum DPB size is 1, a variable or a syntax element is set to a target value to impose restriction to use only one picture storage buffer in the DPB to store reference picture for encoding or decoding of a current picture.

12 Claims, 4 Drawing Sheets

(51) Int. Cl.
*H04N 19/70* (2014.01)
*H04N 19/172* (2014.01)
*H04N 19/134* (2014.01)
*H04N 19/152* (2014.01)
*H04N 19/82* (2014.01)
*H04N 19/58* (2014.01)
*H04N 19/423* (2014.01)
*H04N 19/174* (2014.01)

(52) U.S. Cl.
CPC ......... *H04N 19/152* (2014.11); *H04N 19/172* (2014.11); *H04N 19/423* (2014.11); *H04N 19/58* (2014.11); *H04N 19/70* (2014.11); *H04N 19/82* (2014.11); *H04N 19/174* (2014.11)

(56) References Cited

OTHER PUBLICATIONS

Joshi, R., et al.; "High Efficiency Video Coding (HEVC) Screen Content Coding: Draft 4;" Joint Collaborative Team on Video Coding (JCT-VC) of ITU-T SG 16 WP 3 and ISO/IEC JTC 1/SC 29/WG 11; Jun. 2015; pp. 1-666.

Xu, X., et al.; "On storage of filtered and unfiltered current decoded pictures;" Joint Collaborative Team on Video Coding (JCT-VC) of ITU-T SG 16 WP 3 and ISO/IEC JTC 1/SC 29/WG 11; Jun. 2015; pp. 1-2.

Office Action dated Mar. 12, 2019, in Japanese Patent Application No. 2018-512557.

* cited by examiner

METHOD AND SYSTEM OF DECODED PICTURE BUFFER FOR INTRA BLOCK COPY MODE

CROSS REFERENCE TO RELATED APPLICATIONS

The present invention claims priority to U.S. Provisional Patent Application, Ser. No. 62/215,287, filed on Sep. 8, 2015 and U.S. Provisional Patent Application, Ser. No. 62/245,372, filed on Oct. 23, 2015. The U.S. Provisional Patent Applications are hereby incorporated by reference in their entireties.

TECHNICAL FIELD

The present invention relates to palette coding for video data. In particular, the present invention relates to decoded picture buffer management/operation when the coding system uses coding modes including the Inter prediction mode and Intra Block Copy mode.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. HEVC also supports slice structure, where a picture is partitioned into slices and each slice may use its own coding parameters or configurations.

Along with the High Efficiency Video Coding (HEVC) standard development, the development of extensions of HEVC has also started. The HEVC extensions include range extensions (RExt) which target at non-4:2:0 colour formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency.

Intra Block Copy Prediction

In the current development of screen content coding for High Efficiency Video Coding (HEVC) standard, some tools have been adopted due to their improvements in coding efficiency for screen contents. For Intra blocks, Intra prediction according to the conventional approach is performed using prediction based on reconstructed pixels from neighbouring blocks. Intra prediction may select an Intra Mode from a set of Intra Modes, which include a vertical mode, horizontal mode and various angular prediction modes. For HEVC screen content coding, a new Intra coding mode, named Intra-block copy (IntraBC) has been used. The IntraBC technique that was originally proposed by Budagavi in *AHG8: Video coding using Intra motion compensation*, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350 (hereinafter JCTVC-M0350). An example according to JCTVC-M0350 is shown in FIG. 1, where a current coding unit (CU, 110) is coded using Intra MC (motion compensation). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named block vector (BV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process. After prediction residue is formed for each CU, the residue associated with each CU is divided into multiple blocks, named transform units (TUs) to apply transforms.

In JCTVC-M0350, the Intra MC is different from the motion compensation used for Inter prediction in at least the following areas:

MVs are restricted to be 1-D for Intra MC (i.e., either horizontal or vertical) while Inter prediction uses 2-D motion estimation.

Binarization is fixed length for Intra MC while Inter prediction uses exponential-Golomb.

Intra MC introduces a new syntax element to signal whether the MV is horizontal or vertical.

Based on JCTVC-M0350, some modifications are disclosed by Pang, et al. in *Non-RCE3: Intra Motion Compensation with 2-D MVs*, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0256 (hereinafter JCTVC-N0256). Firstly, the Intra MC is extended to support 2-D MVs, so that both MV components can be non-zero at the same time. This provides more flexibility to Intra MC than the original approach, where the MV is restricted to be strictly horizontal or vertical.

In JCTVC-N0256, two BV coding methods are disclosed:

Method 1—Block vector prediction. The left or above BV is selected as the BV predictor and the resulting motion vector difference (BVD) is coded. A flag is used to indicate whether the BVD is zero. When BVD is not zero, exponential-Golomb codes of the 3rd order are used to code the remaining absolute level of the BVD. Another flag is used to code the sign.

Method 2: No block vector prediction. The BV is coded using the exponential-Golomb codes that are used for BVD in HEVC.

Another difference disclosed in JCTVC-N0256 is that the 2-D IntraBC is further combined with the pipeline friendly approach:

1. No interpolation filters are used.
2. BV search area is restricted. Two cases are disclosed:
   a. Search area is the current CTU and the left CTU or
   b. Search area is the current CTU and the rightmost 4 column samples of the left CTU.

Among the proposed methods in JCTVC-N0256, the 2-D IntraBC, the removal of interpolation filters, and the search area constraint to the current CTU and the left CTU have been adopted in a new version of draft HEVC RExt standard.

IntraBC in Existing SCC Draft Standard (SCM)

In JCTVC-T0227 (Pang, et al., *Non-CE2 Test1: Intra block copy and inter signalling unification*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0227), the IntraBC mode is unified with Inter coding mode. In other words, the current picture is treated as a reference picture and inserted into one or both reference picture lists (i.e., lists L0 and L1). Block vector prediction and coding are treated in the same way as Inter motion vector prediction and coding. This unification simplifies the codec design.

Adaptive Motion Resolution

In JCTVC-S0085 (Li, et al., *Adaptive motion vector resolution for screen content*, Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S0085), a flag "use_integer_mv_flag" is used for each slice to indicate the resolution of MV in the slice. If this flag is 1, all the decoded motion vectors in this slice are represented using integer-pel resolution; otherwise, the motion vectors are represented using quarter-pel resolution, as specified in the HEVC standard.

Memory Bandwidth Consideration in Current SCC Draft Standard (SCM)

When reconstructing a block, the reference block needs to be used for prediction. If the motion vector points to a fractional position, more pixels surrounding the reference block are also required for interpolation purpose. When retrieving a reference block and its surrounding pixels when necessary from external memory, the data fetch will be conducted in bulk depending on the memory pattern used. For example, if the memory pattern used is 4×4 sample block, the minimum unit for access data will be 4×4 pixels even if only one pixel is needed. Therefore, more data than the direct related pixels will have to be retrieved and sent to on-chip memory/buffer for further processing. These data are all involved in memory bandwidth consumption. In HEVC, the worst case memory bandwidth consumption is in 8×8 bi-prediction mode with both motion vectors having fractional-pel MVs. When IntraBC mode is used, the unfiltered version of current picture needs to be stored in the external memory in addition to the filtered version of current picture for Inter prediction mode. This is considered as an extra cost to HEVC.

In JCTVC-U0078 (Rapaka, et al., *CE2: Test 5 on intra block copy constraints on prediction*, Joint Collaborative Team on Video Coding (JCT-VC) of ITU-T SG 16 WP 3 and ISO/IEC JTC 1/SC 29/WG 11, 21st Meeting: Warsaw, PL, 19 Jun.-26 Jun. 2015, Document: JCTVC-U0078), some constraints are imposed on the 8×8 bi-prediction mode usage when IntraBC is used. For example, the use of 8×8 bi-prediction mode is disabled when the SPS (sequence Parameter Set) flag for IntraBC is on and slice header flag use_integer_mv_flag (indicating the resolution of MV in the slice) is off.

Decoded Picture Buffer in Current SCC Draft Standard (SCM)

In HEVC, all the reference pictures are stored in a buffer referred as decoded picture buffer (DPB). This is done by each time when decoding a picture, the current decoded picture after the loop filtering operation is put into DPB (referred as filtered version of current decoded picture). For IntraBC, its reference picture is the current decoded picture prior to the loop filter (referred as unfiltered version of current decoded picture), which is an extra picture to be stored in DPB compared to HEVC version 1. In JCTVC-U0181 (Xu, et al., *On storage of filtered and unfiltered current decoded pictures*, Joint Collaborative Team on Video Coding (JCT-VC) of ITU-T SG 16 WP 3 and ISO/IEC JTC 1/SC 29/WG 11, 21st Meeting: Warsaw, PL, 19 Jun.-26 Jun. 2015, Document: JCTVC-U0181), both the filtered and unfiltered versions of the current decoded picture are put into DPB for picture buffer management. For convenience, the filtered version or unfiltered version of the current decoded picture may be referred as the filtered version or unfiltered version of the current picture by dropping the word "decoded". The unfiltered version of current picture will be discarded after the completion of decoding the current picture and the storage buffer for this picture will be released.

The case that the two versions of current decoded picture are identical is considered. This occurs when no loop filters (deblocking or SAO) are used for the current picture. In the current HEVC SCC working draft as described in JCTVC-U1005 (Joshi, et al., *High Efficiency Video Coding (HEVC) Screen Content Coding: Draft 3*, Joint Collaborative Team on Video Coding (JCT-VC) of ITU-T SG 16 WP 3 and ISO/IEC JTC 1/SC 29/WG 11, 21st Meeting: Warsaw, PL, 19 Jun.-26 Jun. 2015, Document: JCTVC-U1005), a variable referred as TwoVersionsOfCurrDecPicFlag is used to identify whether the current picture is used as a reference picture. If so, there may be two different versions of the current picture due to the use of loop filters in the picture.

1) Current decoded picture after the invocation of loop filter is stored in DPB. This picture, upon completion of decoding current picture, is marked as "used for short-term reference". When the decoding is completed, this picture is stored in DPB for future usage.
2) When TwoVersionsOfCurrDecPicFlag flag is equal to 1, current decoded picture before the invocation of loop filter is stored in DPB, in a separate buffer. This picture is marked as "used for long-term reference" and is used for IntraBC compensation. When the decoding is completed, this picture is removed from DPB.

According to the HEVC specification, Short-Term Reference Picture Sets are designed to provide reference to pictures in the temporal proximity of the current picture such as within the same structure of pictures. On the other hand, Long-Term Reference Picture Sets can be used to address selected pictures for longer term reference purpose. These long-term reference picture sets are constructed independently from the short-term picture sets. With the changes in decoded picture buffer management when current picture is a reference picture, some constraints need to be imposed to make sure that the function of decoded picture buffer management works properly.

SUMMARY

A method and system of managing a DPB (decoded picture buffer) for a video encoder or decoder using coding modes including an Inter prediction mode and an Intra Block Copy (IntraBC) mode are disclosed. If IntraBC mode is enabled and no loop filter is used for a current picture, a set of steps are performed to ensure proper DPB operation. The set of steps comprise marking a currently decoded reference picture for the current picture as a long-term reference picture before and during decoding of the current picture, assigning the currently decoded reference picture in reference picture list construction for IntraBC reference of the current picture and calculating buffer fullness for the DPB before starting decoding the current picture by taking into account of only one reference picture buffer. The currently decoded reference picture corresponds to an empty picture storage buffer in the DPB. Furthermore, the method may include marking the currently decoded reference picture in the DPB as a short-term reference picture after decoding of the current picture and keeping the currently decoded reference picture in the DPB for future use.

Another method and system of managing a DPB are disclosed, where if the maximum DPB size corresponds to 1, the method comprises setting a variable or a syntax element to a target value to impose restriction to use only one picture storage buffer in the DPB to store reference picture for encoding or decoding of a current picture. For example, setting the variable or the syntax element to the target value corresponds to setting a slice type for slices in the current picture to I-slice if the IntraBC mode is not used for the current picture. In another example, setting the variable or the syntax element to the target value corresponds to setting a variable TwoVersionsOfCurrDecPicFlag to a first value corresponding to only one version of a current decoded picture being used. The variable TwoVersionsOfCurrDecPicFlag indicates whether two versions of current decoded picture are used. In yet another example, setting the variable or the syntax element to the target value corresponds to setting an IntraBC flag in PPS (picture parameter set) to a second value to indicate the IntraBC mode not used for the current picture.

Yet another method and system of managing a DPB are disclosed, where the total number of reference pictures for decoding a current picture or slice is calculated by taking into account of information regarding whether two versions of a current decoded picture are used. The RPS (reference picture set) for decoding a current picture or slice comprises short-term and long-term reference pictures. For example, the total number of reference pictures is calculated as a sum of a first total number of short-term RPS (reference picture set) that have POC (picture order count) values less than the POC value of the current picture, a second total number of short-term RPS that have the POC values greater than the POC value of the current picture, a third total number of long-term RPS, and a version value associated with the information regarding whether two versions of the current decoded picture are used. The version value is 1 if two versions of the current decoded picture are used and the version value is 0 if one version of the current decoded picture is used. If the total number of reference pictures is greater than a maximum required size of the DPB minus 1 specified in the SPS (sequence parameter set), the total number of reference pictures is set to the maximum required size of the DPB minus 1 or smaller.

DETAILED DESCRIPTION

Figure 1:
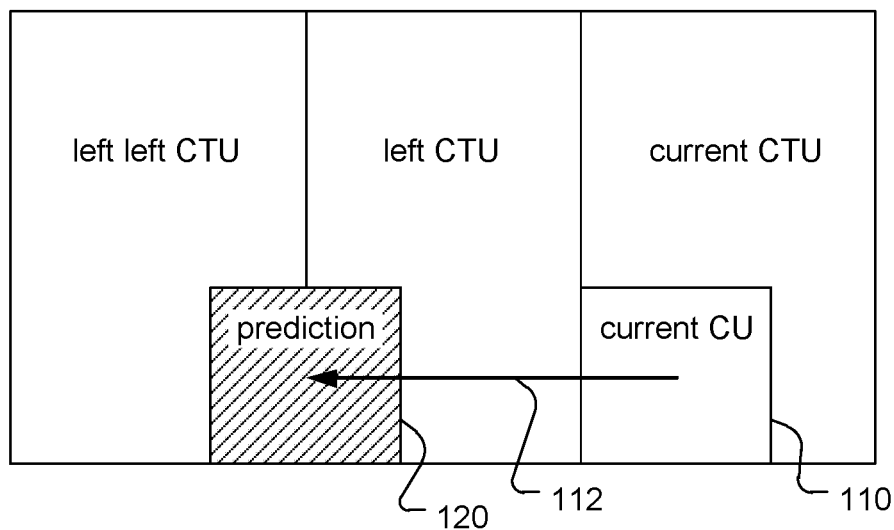
FIG. 1 illustrates an example of Intra Block Copy (IntraBC) mode, where a current block is predicted by a reference block in the current picture.

The following description is of the best-contemplated mode of carrying out the invention. This description is made for the purpose of illustrating the general principles of the invention and should not be taken in a limiting sense. The scope of the invention is best determined by reference to the appended claims.

As mentioned earlier, the existing decoded picture buffer (DPB) management may not work properly when the current reconstructed picture can be used as a reference picture according to the Intra Block Copy (IntraBC) mode. In order to overcome issues associated with DPB operation when IntraBC is used, various methods for operating the DPB are disclosed.

Method 1: Maximum Decoded Picture Buffer Size Calculation

A syntax element sps_max_dec_pic_buffering_minus1 is signalled in the sequence parameter set (SPS) level of the bitstream for each temporal layer to limit the total number of decoded and stored pictures allowed. This syntax element should be smaller than or equal to (MaxDPBSize−1), where MaxDPBSize is used to determine the maximally allowed DPB size in the standard for a given picture resolution. In HEVC, one picture buffer in the DPB is reserved for storing the filtered version of the current decoded picture. The rest of DPB is used to store other temporal reference pictures or decoded pictures pending for output. The sum of all these stored pictures in the DPB, including the temporal reference pictures and pictures pending for output, should be smaller than or equal to the value of SPS syntax element sps_max_dec_pic_buffering_minus1 for this layer, which specifies the maximum required size of the DPB for the CVS (coded video sequence) in units of picture storage buffers according to JCTVC-U1005. The value of SPS syntax element sps_max_dec_pic_buffering_minus1 shall be in the range of 0 to MaxDpbSize−1, inclusive.

When the current picture is used as a reference picture, the unfiltered version of the current picture may need to be placed into the DPB as well. According to one embodiment of Method 1, the number of reference pictures allowed in terms of DPB capability is calculated by taking into account of whether the unfiltered version of the current decoded picture is identical to the filtered version of the current decoded picture. For example, when both versions are identical, there is no need to create or reserve a picture buffer for the unfiltered version of current picture. This may occur when no loop filters are used for the current decoded picture. Therefore this unused picture buffer can be assigned such that one more temporal reference picture could be stored in the DPB and used for predicting the current picture. Otherwise, when the current picture is used as a reference picture and the two versions of current decoded picture are different, both versions of the current picture need to be stored in the DPB. The rest of the DPB will be used to store temporal reference pictures and possibly other pictures pending for output. In all cases, the sum of the number of reference pictures and the number of current pictures (one or two versions) should be smaller than or equal to the maximally allowed number of decoded pictures in the DPB.

In one embodiment, the variable TwoVersionsOfCurrDecPicFlag is used to identify whether the current picture is used as a reference picture and whether the two versions of current picture are different. When this variable is equal to 1, it means that there are two different versions of the current picture and the current picture is used as a reference picture. When this variable is equal to 0, it means there is only one version of the current picture or the current picture is never used as a reference picture for decoding current picture. Exemplary DPB size calculation according to one embodiment of the present invention is shown below, where the section "General Slice Segment Header Semantics" as specified in subclause 7.4.7.1 of JCTVC-U1005 is modified as follows, and texts in Italic style indicate added texts:

num_long_term_pics specifies the number of entries in the long-term RPS of the current picture that are directly signalled in the slice header. When not present, the value of num_long_term_pics is inferred to be equal to 0.

When nuh_layer_id is equal to 0, the sum of NumNegativePics[CurrRpsIdx], NumPositivePics[CurrRpsIdx], num_long_term_sps, *TwoVersionsOfCurrDecPicFlag,* and num_long_term_pics shall be less than or equal to sps_max_dec_pic_buffering_minus1[sps_max_sub_layers_minus1].

NumNegativePics[CurrRpsIdx] specifies the number of entries in the CurrRpsIdx-th candidate short-term RPS (reference picture set) that have picture order count values less than the picture order count (POC) value of the current picture. NumPositivePics[CurrRpsIdx] specifies the number of entries in the CurrRpsIdx-th candidate short-term RPS (reference picture set) that have picture order count values greater than the picture order count (POC) value of the current picture. num_long_term_sps specifies the number of entries in the long-term RPS of the current picture that are derived based on the candidate long-term reference pictures specified in the active SPS. sps_max_dec_pic_buffering_minus1 specifies the maximum required size of the decoded picture buffer for the coded video sequence. As shown above, the DPB size according an embodiment of the present invention is calculated as the sum of the short-term RPS (i.e., NumNegativePics and NumPositivePics), the long-term RPS (i.e., num_long_term_sps and num_long_term_pics) and the variable TwoVersionsOfCurrDecPicFlag.

Method 2: Constraint on the Use of IntraBC when Maximally Allowed DPB Size is Limited When the maximum decoded picture buffer size is 1 (e. g. sps_max_dec_pic_buffering_minus1 for one sub-layer containing the current picture equal to 0), it implies that the only available decoded picture buffer for this layer is used to store the current decoded picture (i. e., the filtered version). In this case, if IntraBC is not used for the current picture, the slice type for slices in this picture should be I-slice. Method 2 of the present invention does not allow the current picture be used as a reference picture for decoding the current picture when the maximum decoded picture buffer size for the current coded video stream is 1 (e. g. sps_max_dec_pic_buffering_minus1 for the sub-layer containing the current picture equal to 0).

In one embodiment, the syntax element pps_curr_pic_ref_enabled_flag is used as a PPS (picture parameter set) flag to indicate whether IntraBC is used for the current picture referring to the PPS. An exemplary constraint is shown as follows, where the section "General Slice Segment Header Semantics" as specified in subclause 7.4.7.1 of JCTVC-U1005 is modified:

Slice type semantics . . . .

When nal_unit_type has a value in the range of BLA_W_LP to RSV_IRAP_VCL23, inclusive, i.e., the picture is an IRAP picture, nuh_layer_id is equal to 0, and pps_curr_pic_ref_enabled_flag is equal to 0, slice_type shall be equal to 2.

When sps_max_dec_pic_buffering_minus1[TemporalId] is equal to 0 and nuh_layer_id is equal to 0, slice_type shall be equal to 2.

An exemplary constraint is shown as follows, where the section "Picture Parameter Set Range Extension Semantics" as specified in subclause 7.4.3.3.2 of JCTVC-U1005 is modified, where texts in Italic style indicate added texts:

pps_curr_pic_ref_enabled_flag equal to 1 specifies that a picture referring to the PPS may be included in a reference picture list of a slice of the picture itself pps_curr_pic_ref_enabled_flag equal to 0 specifies that a picture referring to the PPS is never included in a reference picture list of a slice of the picture itself. When not present, the value of pps_curr_pic_ref_enabled_flag is inferred to be equal to 0.

It is a requirement of bitstream conformance that when sps_curr_pic_ref_enabled_flag is equal to 0, the value of pps_curr_pic_ref_enabled_flag shall be equal to 0.

*It is a requirement of bitstream conformance that when sps_max_dec_pic_buffering_minus1[TemporalId] is equal to 0 and nuh_layer_id is equal to 0, pps_curr_pic_ref_enabled_fiag shall be 0.*

In another alternative to Method 2, when the maximum decoded picture buffer size is 1 (e. g. sps_max_dec_pic_buffering_minus1 for the sub-layer containing current picture equal to 0), the current picture should not be used as a reference picture for decoding current picture.

In this method, the variable TwoVersionsOfCurrDecPicFlag is used to identify whether the current picture is used as a reference picture and whether the two versions of current picture are different. When this variable is equal to 1, it means there are two different versions of the current picture and the current picture is used as a reference picture. When this variable is equal to 0, it means there is only one version of the current picture or the current picture is never used as a reference picture for decoding the current picture. In one embodiment, it is required for the bitstream conformance that if TwoVersionsOfCurrDecPicFlag is equal to 1, the syntax element sps_max_dec_pic_buffering_minus1 for the sub-layer containing current picture shall be greater than 0. In another embodiment, it is required for the bitstream conformance that if sps_max_dec_pic_buffering_minus1 for the sub-layer containing current picture is equal to 0, the value TwoVersionsOfCurrDecPicFlag shall be 0.

In yet another alternative Method 2, if no loop filters are used for the current picture, when the maximum decoded picture buffer size is 1 (e. g. sps_max_dec_pic_buffering_minus1 for the sub-layer containing current picture equal to 0), the current picture may be used as a reference picture for decoding the current picture. And this current picture should be the only reference picture that can be used for decoding the current picture.

Method 3: Storing the Reference Picture for IntraBC in the Picture Buffer when No-Loop Filters are Used for the Current Picture When IntraBC is used for the current picture, the reference picture for IntraBC is the unfiltered version of the current picture. If no loop filters are used for the current picture, the two versions of the current decoded picture are identical. There is no picture buffer created in DPB to store the extra (unfiltered) version of the current decoded picture, which is the reference picture for the current picture. In this case, Method 3 according to the present invention modifies the assignment of reference picture buffer so that the IntraBC can refer to the correct picture buffer, which stores the current decoded picture as a reference picture for the current picture.

When IntraBC is used and no loop filters are used, there is only one version of current picture. Therefore, according to Method 3, only one picture buffer will be created in DPB for storing the current decoded picture. This picture will be used as a reference picture for IntraBC. In one embodiment, this picture referred as the filtered version of current picture will be used as the reference picture for IntraBC usage. In another embodiment, in the case that IntraBC is used and no loop filters are used, when there is only one version of the current picture, the current picture is marked as "used for long-term reference" at the beginning of and during the process of decoding the current picture. After decoding the current picture is completed, this picture is marked as "used for short-term reference". In yet another embodiment, at the beginning and during the process of decoding current picture, the filtered version of current picture is marked as "used for long-term reference". After the decoding of the current picture is completed, the filtered version of current picture is marked as "used for short-term reference".

In one embodiment, the variable TwoVersionsOfCurrDecPicFlag is used to identify whether the current picture is used as a reference picture and whether the two versions of current picture are different. When this variable is equal to 1, it implies that there are two different versions of the current picture and the current picture is used as a reference picture. When this variable is equal to 0, it implies that there is only one version of the current picture or the current picture is never used as a reference picture for decoding the current picture. Embodiments of the present invention can be applied to the existing video coding standards (e.g. HEVC) by modifying the decoding process of the existing video coding standards. For example, parts of the subclause 8.1.3 of JCTVC-U1005 can be modified as follows, where texts enclosed by a bracket pair and an asterisk pair (i. e., [*deleted texts*]) indicate deleted texts, and texts in Italic style indicate added texts:

8.1.3 Decoding Process for a Coded Picture with nuh_layer_id equal to 0;
3. The processes in clauses 8.4, 8.5, 8.6, and 8.7 specify decoding processes using syntax elements in all syntax structure layers. It is a requirement of bitstream conformance that the coded slices of the picture shall contain slice segment data for every coding tree unit of the picture, such that the division of the picture into slices, the division of the slices into slice segments, and the division of the slice segments into coding tree units each forms a partitioning of the picture. Decoded sample values of the current picture after the invocation of the in-loop filter process as specified in clause 8.7 are stored in the picture storage buffer for the current picture [*and not marked as "used for long-term reference"*]. *When TwoVersionsOfCurrDecPicFlag is equal to 0, the current picture after the invocation of the in-loop filter process as specified in clause 8.7 is marked as "used for long-term reference". When TwoVersionsOfCurrDecPicFlag is equal to 1, the decoded sample values of the current picture immediately before the invocation of the in-loop filter process as specified in clause 8.7 are stored in the picture storage buffer for the current picture and marked as "used for long-term reference".*

The subclause 8.3.4 of JCTVC-U1005 can be modified as follows, where texts enclosed by a bracket pair and an asterisk pair (i. e., [*deleted texts*]) indicate deleted texts, and texts in Italic style indicate added texts:
8.3.4 Decoding Process for Reference Picture Lists Construction;
[*Let the variable currPic be the current decoded picture that is marked as "used for long-term reference"*]. *When TwoVersionsOfCurrDecPicFlag is equal to 1, let the variable currPic be the current decoded picture before the invocation of the in-loop filter process as specified in clause 8.7; otherwise (TwoVersionsOfCurrDecPicFlag is equal to 0), let the variable currPic be the current decoded picture after the invocation of the in-loop filter process as specified in clause 8.7.*

The Annex C 3.4 of JCTVC-U1005 can be modified as follows, where texts in Italic style indicate added texts:
Annex C 3.4 Current Decoded Picture Marking and Storage;
When TwoVersionsOfCurrDecPicFlag is equal to 1,
The current decoded picture after the invocation of the in-loop filter process as specified in clause 8.7 is stored in the DPB in an empty picture storage buffer, the DPB fullness is incremented by one, and this picture is marked as "used for short-term reference".
Otherwise,
The current decoded picture after the invocation of the in-loop filter process as specified in clause 8.7 is stored in the DPB in an empty picture storage buffer, the DPB fullness is incremented by one, and this picture is marked as "used for long-term reference". After all slices of the current picture have been decoded, the current decoded picture, after the invocation of the in-loop filter process as specified in clause 8.7, is marked as "used for short-term reference".

Usage and Marking of Picture Buffer for IntraBC

The current decoded picture after loop filtering needs to be stored in the DPB (decoded picture buffer), for future usage (i.e., either output or as a reference picture for future pictures). When IntraBC is used for the current picture, the reference picture for IntraBC is the unfiltered version of the current picture (i.e., decoded picture before loop filtering). If no loop filters are used for current picture, these two versions of the current decoded picture are identical. In this case, there is no need to use an extra picture buffer in the DPB to store a duplicated version of the current decoded picture. Therefore, only one version of current decoded picture needs to be stored in the DPB. According to one embodiment of this method, the assignment of reference picture buffer is modified so that the IntraBC can refer to the correct picture buffer, which stores the current decoded picture as a reference picture for the current picture.

Specifically, when IntraBC is enabled and no loop filters are used, only one version of current picture is used as the reference picture according to one embodiment of the method. Before and during decoding the current picture, this current picture is marked as "used for long-term reference" and is used as the reference picture for IntraBC operation. After decoding the current picture is completed, this current picture is marked as "used for short-term reference".

The syntax and semantics based on existing HEVC SCC draft standard (JCTVC-U1005) can be modified to implement the buffer management as disclosed above. Exemplary modifications to the syntax and semantics are illustrated as follows.

Some parts of the subclause 8.1.3, "Decoding process for a coded picture with nuh_layer_id equal to 0" are modified. In particular, item 3 of subclause 8.1.3 is modified as follows, where texts in Italic style indicate added text.
3. The processes in clauses 8.4, 8.5, 8.6, and 8.7 specify decoding processes using syntax elements in all syntax structure layers. It is a requirement of bitstream conformance that the coded slices of the picture shall contain slice segment data for every coding tree unit of the picture, such that the division of the picture into slices, the division of the slices into slice segments, and the division of the slice segments into coding tree units each forms a partitioning of the picture. When TwoVersionsOfCurrDecPicFlag is equal to 1, decoded sample values of the current picture after the invocation of the in-loop filter process as specified in clause 8.7 are stored in the picture storage buffer for the current picture. The decoded sample values of the current picture immediately before the invocation of the inloop filter process as specified in clause 8.7 are stored in another picture storage buffer for the current picture and marked as "used for long-term reference". When TwoVersionsOfCurrDecPicFlag is equal to 0 and pps_curr_pic_as_ref_enabled_flag is equal to 0, decoded sample values of the current picture after the invocation of the in-loop filter process as specified in clause 8.7 are stored in the picture storage buffer for the current picture. When TwoVersionsOfCurrDecPicFlag is equal to 0 and pps_curr_pic_as_ref_enabled_flag is equal to 1, the decoded sample values of the current picture immediately before the invocation of the in-loop filter process as specified in clause 8.7 are stored in the picture storage buffer for the current picture and marked as "used for long-term reference".

In another example, the last sentence in item 3 of subclause can be modified as, "the decoded sample values of the current picture after the invocation of the in-loop filter process as specified in clause 8.7 are stored in the picture storage buffer for the current picture and marked as "used for long-term reference".

Some parts of the subclause 8.3.4, "Decoding process for reference picture lists construction" are modified as follows, where texts enclosed by a bracket pair and an asterisk pair indicate deletion (i.e., [*deleted text*]) and texts in Italic style indicate added text.

[*Let the variable currPic be the current decoded picture that is marked as "used for long-term reference".*] When TwoVersionsOfCurrDecPicFlag is equal to 1, let the variable currPic be the current decoded picture before the invocation of the in-loop filter process as specified in clause 8.7; otherwise (TwoVersionsOfCurrDecPicFlag is equal to 0), let the variable currPic be the current decoded picture after the invocation of the in-loop filter process as specified in clause 8.7.

In another example, the last sentence of above example can be modified as, "otherwise (TwoVersionsOfCurrDecPicFlag is equal to 0), let the variable currPic be the current decoded picture immediately before the invocation of the in-loop filter process as specified in clause 8.7.".

Also, some parts of subclause Annex C 3.4, "Current decoded picture marking and storage" needs modified as follows, where texts enclosed by a bracket pair and an asterisk pair indicate deletion (i.e., [*deleted text*]) and texts in Italic style indicate added text.

If TwoVersionsOfCurrDecPicFlag is equal to 1,
The current decoded picture after the invocation of the in-loop filter process as specified in clause 8.7 is stored in the DPB in an empty picture storage buffer, the DPB fullness is incremented by one, and this picture is marked as "used for short-term reference".
[*When TwoVersionsOfCurrDecPicFlag is equal to 1,*] The current decoded picture before the invocation of the in-loop filter process as specified in clause 8.7 is stored in the DPB in an empty picture storage buffer, the DPB fullness is incremented by one, and this picture is marked as "used for long-term reference".

. . . .

Otherwise if TwoVersionsOfCurrDecPicFlag is equal to 0 and pps_curr_pic_ref enabled_flag is equal to 0,
The current decoded picture after the invocation of the in-loop filter process as specified in clause 8.7 is stored in the DPB in an empty picture storage buffer, the DPB fullness is incremented by one, and this picture is marked as "used for short-term reference".
Otherwise (TwoVersionsOfCurrDecPicFlag is equal to 0 and pps_curr_pic_ref_enabled_flag is equal to 1),
The current decoded picture after the invocation of the in-loop filter process as specified in clause 8.7 is stored in the DPB in an empty picture storage buffer, the DPB fullness is incremented by one, and this picture is marked as "used for long-term reference". After all slices of the current picture have been decoded, the current decoded picture, after the invocation of the in-loop filter process as specified in clause 8.7, is marked as "used for short-term reference".

In another example, the last sentence of the above paragraph can be modified as "the current decoded picture, immediately before the invocation of the in-loop filter process as specified in clause 8.7, is marked as "used for short-term reference".

Figure 2:
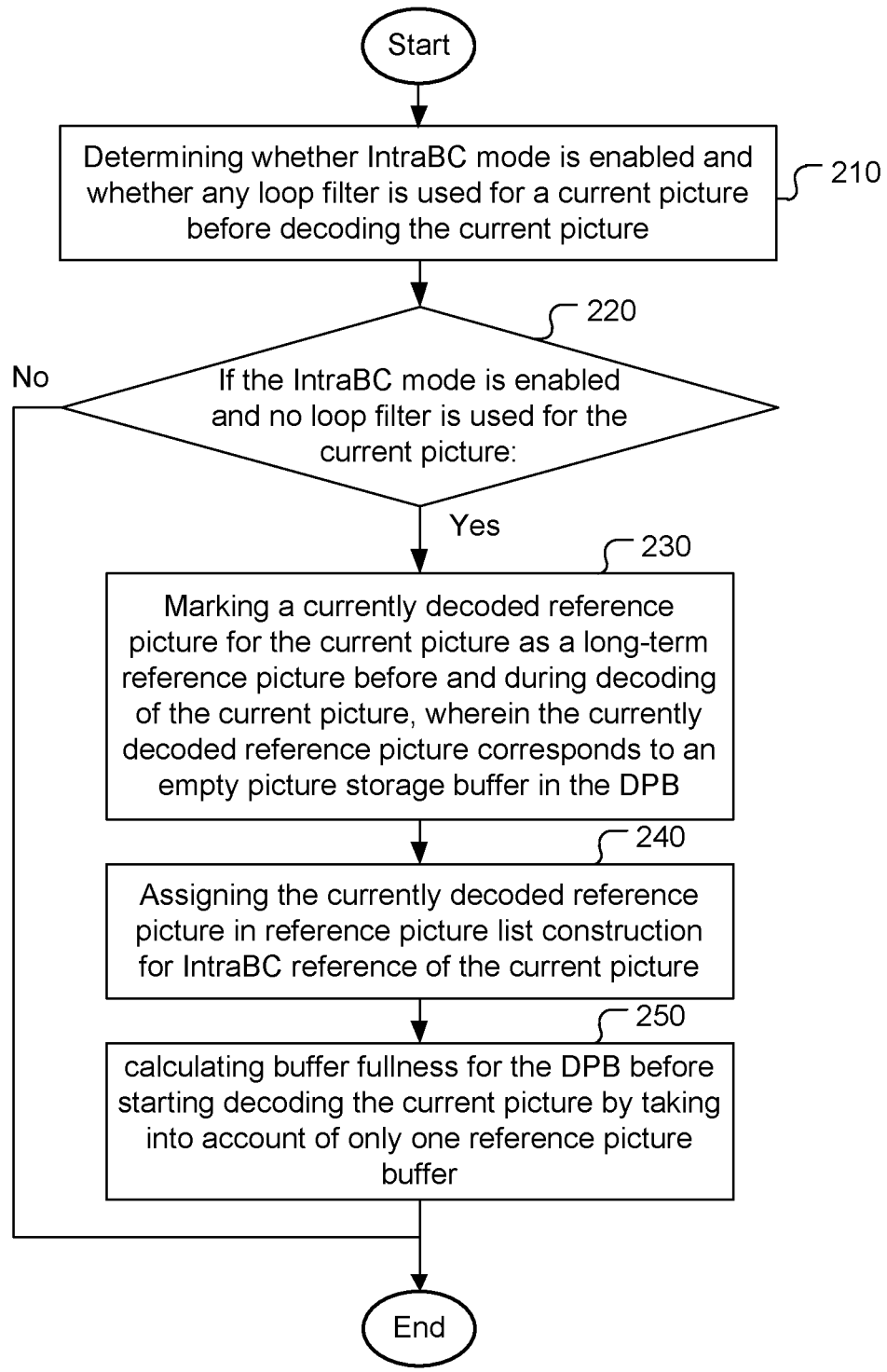
FIG. 2 illustrates a flowchart of an exemplary coding system incorporating decoded picture buffer (DPB) management/operation according to an embodiment of the present invention.

FIG. 2 illustrates a flowchart of an exemplary coding system incorporating decoded picture buffer (DPB) management/operation according to an embodiment of the present invention. The process determines whether IntraBC mode is enabled and whether any loop filter is used for a current picture before decoding the current picture in step 210. Whether the IntraBC mode is enabled and no loop filter is used for the current picture is checked in step 220. If the result is "Yes" steps 230 through 250 are performed. If the result is "No", the process is terminated. In step 230, a currently decoded reference picture for the current picture is marked as a long-term reference picture before and during decoding of the current picture, where the currently decoded reference picture corresponds to an empty picture storage buffer in the DPB. In step 240, the currently decoded reference picture is assigned in reference picture list construction for IntraBC reference of the current picture. In step 250, buffer fullness for the DPB is calculated before starting decoding the current picture by taking into account of only one reference picture buffer.

Figure 3:
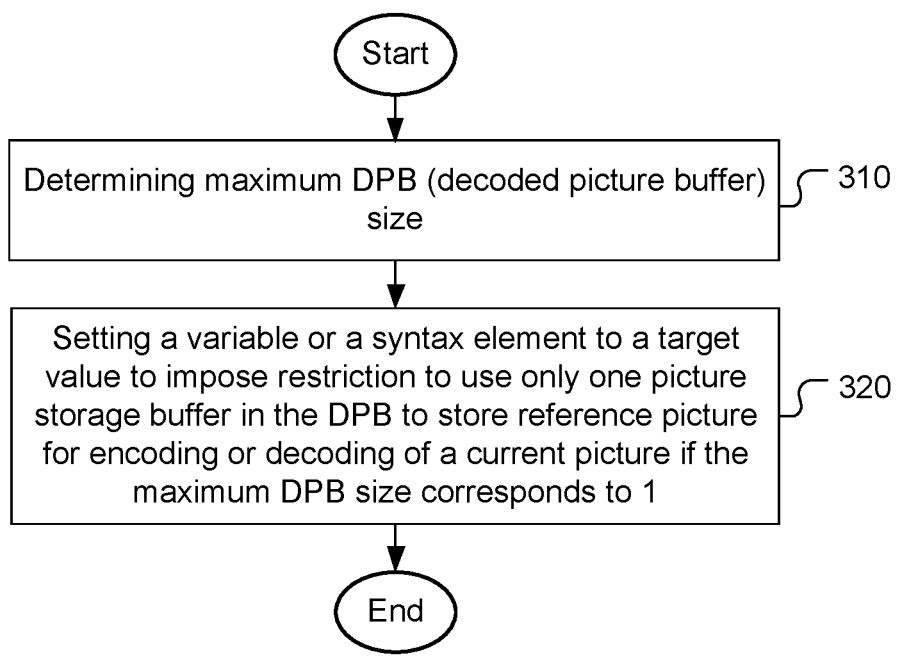
FIG. 3 illustrates a flowchart of an exemplary coding system incorporating decoded picture buffer (DPB) management/operation for maximum DPB size equal to 1 according to an embodiment of the present invention.

FIG. 3 illustrates a flowchart of an exemplary coding system incorporating decoded picture buffer (DPB) management/operation for maximum DPB size equal to 1 according to an embodiment of the present invention. The process determines maximum DPB (decoded picture buffer) size in step 310. A variable or a syntax element is set to a target value to impose restriction to use only one picture storage buffer in the DPB to store reference picture for encoding or decoding of a current picture if the maximum DPB size corresponds to 1 in step 320.

Figure 4:
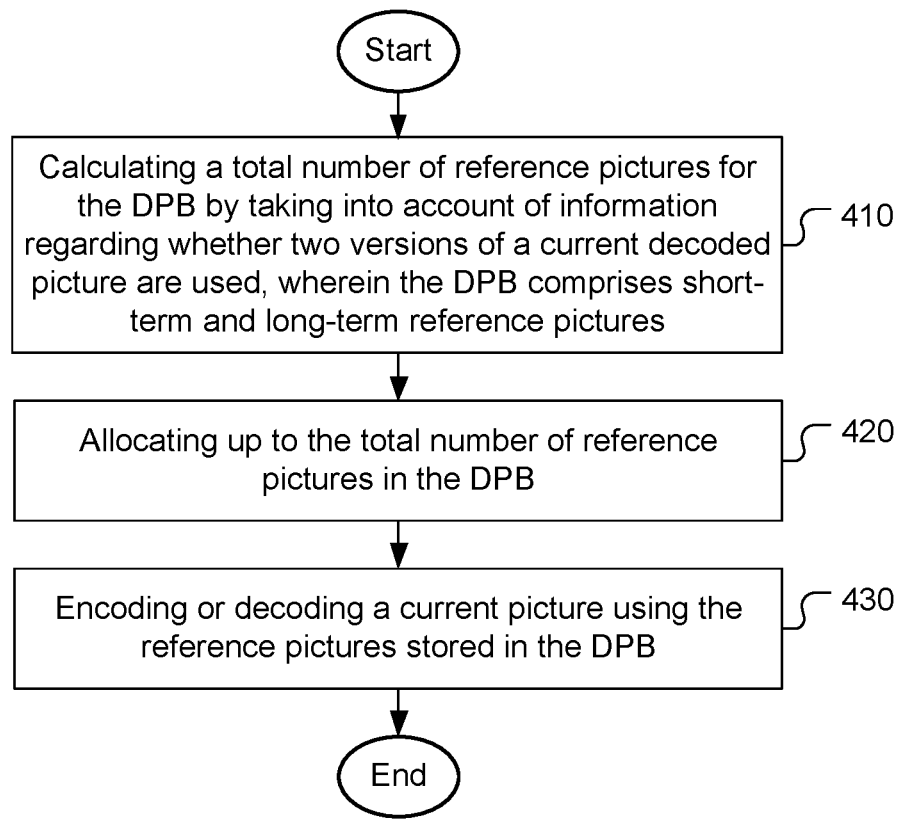
FIG. 4 illustrates a flowchart of an exemplary coding system according to an embodiment of the present invention, where the total number of reference pictures for the DPB is calculated by taking into account of information regarding whether two versions of a current decoded picture are used.

FIG. 4 illustrates a flowchart of an exemplary coding system according to an embodiment of the present invention, where the total number of reference pictures for the DPB is calculated by taking into account of information regarding whether two versions of a current decoded picture are used. The process calculates a total number of reference pictures for the DPB by taking into account of information regarding whether two versions of a current decoded picture are used in step 410. The DPB comprises short-term and long-term reference pictures. Up to the total number of reference pictures is allocated in the DPB as shown in step 420. A current picture is then encoded or decoded using the reference pictures stored in the DPB as shown in step 430.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of managing a DPB (decoded picture buffer) for a video encoder or decoder using coding modes including an Inter prediction mode and an Intra Block Copy (IntraBC) mode, comprising:
    determining a maximum DPB (decoded picture buffer) size; and
    in response to the maximum DPB size corresponding to 1, setting a variable or a syntax element to a target value to impose restriction to use only one picture for the DPB,
    wherein setting the variable or the syntax element to the target value corresponds to setting the variable to a first value corresponding to only one version of a current decoded picture being used if the IntraBC mode is used for the current picture, wherein the variable indicates whether two versions of the current decoded picture are used.

2. The method of claim 1, wherein said setting the variable or the syntax element to the target value corresponds to setting a slice type for slices in the current picture to I-slice if the IntraBC mode is not used for the current picture.

3. The method of claim 1, wherein the variable is a variable TwoVersionsOfCurrDecPicFlag.

4. The method of claim 1, wherein said setting the variable or the syntax element to the target value corresponds to setting an IntraBC flag in PPS (picture parameter set) to a second value to indicate the IntraBC mode not used for the current picture.

5. A video encoder or decoder using coding modes including an Inter prediction mode and an Intra Block Copy (IntraBC) mode, comprising a DPB (decoded picture buffer) and one or more electronic circuits arranged to:
    determine a maximum DPB (decoded picture buffer) size; and
    in response to the maximum DPB size corresponding to 1, set a variable or a syntax element to a target value to impose restriction to use only one picture for the DPB,
    wherein setting the variable or the syntax element to the target value corresponds to setting the variable to a first value corresponding to only one version of a current decoded picture being used if the IntraBC mode is used for the current picture, wherein the variable indicates whether two versions of the current decoded picture are used.

6. The video encoder or decoder of claim 5, wherein said set the variable or the syntax element to the target value corresponds to set a slice type for slices in the current picture to I-slice if the IntraBC mode is not used for the current picture.

7. The video encoder or decoder of claim 5, wherein the variable is a variable TwoVersionsOfCurrDecPicFlag.

8. The video encoder or decoder of claim 5, wherein said set the variable or the syntax element to the target value corresponds to set an IntraBC flag in PPS (picture parameter set) to a second value to indicate the IntraBC mode not used for the current picture.

9. A digital signal processor comprising program code that, when executed, causes the digital signal processor to:
    determine a maximum DPB (decoded picture buffer) size; and
    in response to the maximum DPB size corresponding to 1, set a variable or a syntax element to a target value to impose restriction to use only one picture for the DPB,
    wherein setting the variable or the syntax element to the target value corresponds to setting the variable to a first value corresponding to only one version of a current decoded picture being used if an Intra Block Copy (IntraBC) mode is used for the current picture, wherein the variable indicates whether two versions of the current decoded picture are used.

10. The digital signal processor of claim 9, wherein said set the variable or the syntax element to the target value corresponds to set a slice type for slices in the current picture to I-slice if the IntraBC mode is not used for the current picture.

11. The digital signal processor of claim 9, wherein the variable is a variable TwoVersionsOfCurrDecPicFlag.

12. The digital signal processor of claim 9, wherein said set the variable or the syntax element to the target value corresponds to set an IntraBC flag in PPS (picture parameter set) to a second value to indicate the IntraBC mode not used for the current picture.

* * * * *